Figure 1:
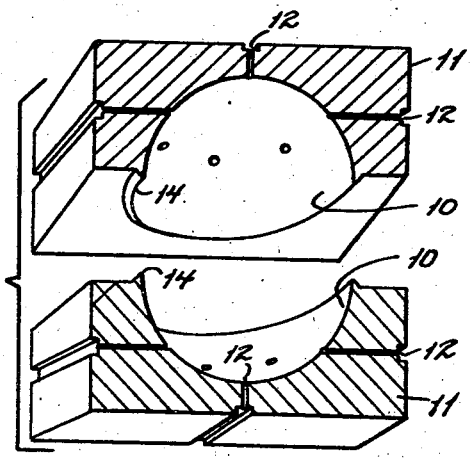

Aug. 13, 1940.  F. T. ROBERTS  2,211,028
METHOD OF MAKING HOLLOW ELASTIC BALLS
Original Filed Sept. 2, 1938   4 Sheets-Sheet 1

INVENTOR
Fred T. Roberts
BY Bates, Goldek & Teare
ATTORNEYS

Aug. 13, 1940.   F. T. ROBERTS   2,211,028
METHOD OF MAKING HOLLOW ELASTIC BALLS
Original Filed Sept. 2, 1938   4 Sheets-Sheet 2

INVENTOR
Fred T. Roberts,
BY
Bates, Goldrick Neary
ATTORNEYS

Aug. 13, 1940.  F. T. ROBERTS  2,211,028
METHOD OF MAKING HOLLOW ELASTIC BALLS
Original Filed Sept. 2, 1938    4 Sheets-Sheet 3

INVENTOR
Fred T. Roberts,
BY
Bates, Goldet & Fear
ATTORNEYS

Aug. 13, 1940.　　　F. T. ROBERTS　　　2,211,028
METHOD OF MAKING HOLLOW ELASTIC BALLS
Original Filed Sept. 2, 1938　　4 Sheets-Sheet 4

INVENTOR
Fred T. Roberts
BY
Bates, Goldrick & Teare
ATTORNEYS.

Patented Aug. 13, 1940

2,211,028

UNITED STATES PATENT OFFICE 2,211,028

METHOD OF MAKING HOLLOW ELASTIC BALLS

Fred Thomas Roberts, Los Angeles, Calif., assignor to Albert H. Bates, Shaker Heights, Ohio Original application September 2, 1938, Serial No. 228,093. Divided and this application May 16, 1939, Serial No. 273,865

18 Claims. (Cl. 154—16)

This invention relates to a method of making hollow, elastic balls. The present application is a division of my copending application for Letters Patent, Serial No. 228,093, filed September 2nd, 1938 and a continuation in part of my application Serial No. 112,572, filed November 24th, 1936. More particularly, the present invention relates to a method of making a tennis or other comparatively light and flexible ball, constructed to react when struck with light blows, as distinguished from a golf ball, or similar hard, comparatively solid ball, which reacts only to heavy blows.

I am aware that in the past it has been proposed to produce a golf ball, by wrapping a hollow air-tight core with linen or similar threads which are thereafter coated with rubber, and to which some heavy material, such as litharge or metallic lead is applied. Moreover, it has been proposed to produce a golf ball by taking a small hollow core, of Celluloid, and wrapping around it a comparatively thick covering of thread, which might be of an elastic material, such as rubber strands, and then covering the whole with gutta percha exterior. It has also been proposed to manufacture golf balls by using a hollow, spherical core, which is surrounded by a substantially thick winding of an elastic thread or ribbon and is provided with concentric shells of Celluloid embedded in the winding to restrict the actions of the winding of the core and then covering the whole with a gutta percha covering.

In all of these constructions, the hollow central core has been of a comparatively small diameter, and is comparatively of unyielding form, while the layer of elastic wound thereon has been comparatively thick. Moreover, the final casing has been comparatively thick and only slightly yielding, so that in each case a ball having an external diameter of from two to four times the internal diameter of the hollow core has been produced.

In contradistinction to the golf balls above mentioned, the ball of the present invention is formed with a hollow central sphere of compounded rubber, having a large internal diameter and a comparatively thin wall, so as to be yielding, and this yielding core is surrounded by a thin layer of elastic winding and directly applied to the sphere and the whole is enclosed in a flexible cover. This produces a ball which may be readily distorted from its spherical shape, and thus accomplish the desired reaction. Such a ball is very resilient and capable of long life without material diminution of such resiliency.

The invention of this application is especially well adapted for the manufacture of tennis balls, which balls must be of a definite size, very light weight, and have a high degree of resiliency. Heretofore, the general custom has been to inflate tennis balls with air or gas under pressure. Experience has shown that the mere inflation of the ball does not produce a ball which will maintain its original internal pressure, and hence its resiliency, there being a gradual loss of such pressure and resiliency. The pressure loss, I believe, to a great extent, is due to the seepage of the air or gas through the wall of the rubber ball, probably owing to the fact that the pigments, powders or other substances which are mixed with the rubber to form the compound, from which the ball is formed, permit seepage of the air or gas through the wall of the ball or become saturated by such air or gas. Whatever the cause, it is a well known fact that tennis balls become less and less resilient until in a comparatively short time they cease to be satisfactory for use in the game.

In my prior application, Serial No. 112,572, I considered the elimination of substantially all of the internal fluid pressure of a ball by integrally forming ribs on the internal surface of the ball and winding such internally ribbed ball with stretched rubber strands to maintain the diameter uniform. While one purpose of such strands was to true up the ball and compress the ribs to give the ball the desired amount of resiliency without the use of a high degree of internal fluid pressure, nevertheless they compressed the wall of the ball for purposes hereinafter more fully set out.

The wrapping of the ribbed ball with rubber strands, as above mentioned, results in the normal diameter of the ball being decreased to such an extent that the normal fluid pressure within the ball is increased. I have found that this increased pressure is maintained over extended periods of time. I have also found that when a thin-walled ball of compounded rubber material, to make it comparatively stiff without ribs, is wrapped with an external winding of stretched rubber strands, reducing the diameter of the ball to increase the internal pressure and the resiliency of the ball, such increased pressure is also maintained over long periods of time. Likewise, I have found that when such a thin-walled rubber ball is filled with air or gas to increase its resiliency, its diameter is greater than its normal diameter, that is, its diameter is greater than the diameter of a similar ball having no internal pressure, and I have found that if I wrap such a gas or air-filled ball with stretched rubber strands to decrease its diameter to a diameter substantially equal to or less than its normal diameter, the pressure within the ball is maintained over extended periods of time.

From the above it will be seen that I may provide an improved tennis ball, the life of which is materially longer than the life of the tennis balls of the past, by wrapping a thin-walled rubber or elastic sphere with a sufficiently resisting wall, whether provided with internal ribs or not, as desired, with a thin winding of stretched rubber strands applied directly to the exterior of the sphere to decrease the diameter thereof and increase the internal fluid pressure and therefore the resiliency of the ball, whether or not the pressure in such ball was greater than normal atmospheric pressure before the ball was wound with the elastic strands.

I believe that the retention of the pressure in my improved ball over prolonged periods of time is due to the compression of the material forming the wall of the central sphere. In the case of balls which are filled with air or gas under pressure, I believe that by winding such balls with stretched rubber strands applied directly thereto I not only eliminate the tension set up in the wall of the ball by the internal pressure, but I place such wall in compression in entirety. By placing the wall of the ball in such compression, I greatly compact the compound, filling up any minute pores therein and bringing the pigments, powders and minerals in the compound into a closer mechanical association with the rubber and binding or bonding materials in the compound, and thus eliminate the seepage into or through the wall of the ball.

The main object of the invention of the present application, as has been outlined in the preceding paragraphs, is to provide an improved method for making a flexible thin-walled ball, which ball will be especially adapted for use in tennis or similar games, and which, when so used, will be capable of long life without diminution of its resiliency. The invention, however, has other and more specific features and objects, as, for instance, attaching the different portions of the stretched elastic bands to each other and to the cover, which not only eliminates the deterioration of the strands by adhesive or cement, but which, consequent upon a slight rupture of the cover, will prevent the strands from increasing the rupture; and the provision of a ball in which the strands are protected to enable the ball to be handled during the application of the cover without danger of damaging such strands.

Other objects of the invention are directed to an improved method of making my improved ball, whereby the internal pressure of the ball may be increased after all other operations have been completed, without requiring an internal sealing member, as, for instance, by providing a ball which will admit the insertion of a needle through the wall thereof at any point, to increase the pressure, whereupon the needle may be withdrawn without danger of loss of the pressure.

Other objects of this invention will become more apparent from the following description, which refers to the accompanying drawings illustrating the ball in various stages of manufacture. The essential features of the invention will be summarized in the claims.

Figure 1A:
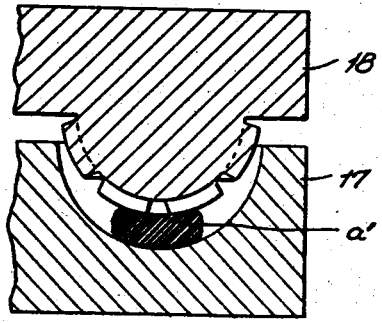
Figure 2:
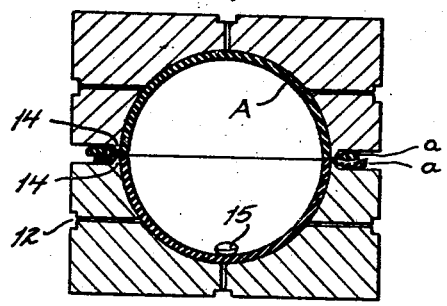
Figure 2A:
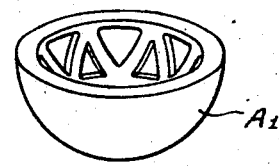
Figure 3:
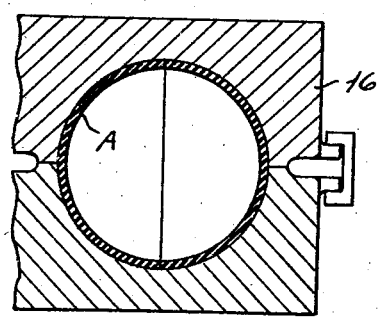
Figure 3A:
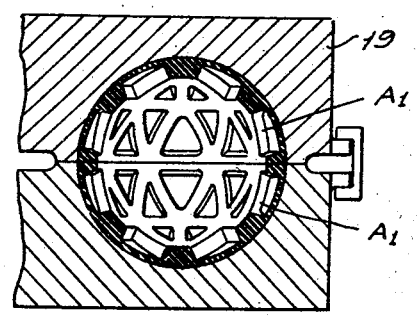
Figure 4:
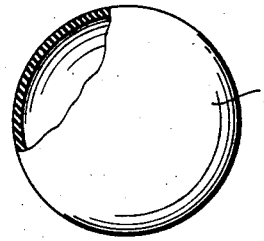
Figure 4A:
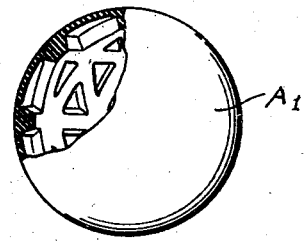
Figure 5:
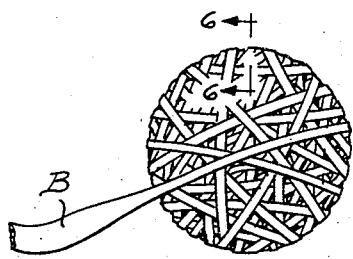
Figure 6:
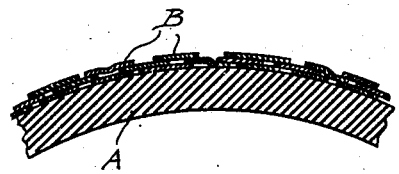
Figure 7:
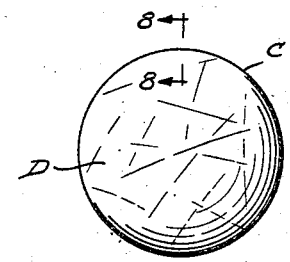
Figure 8:
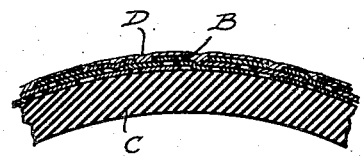
Figure 9:
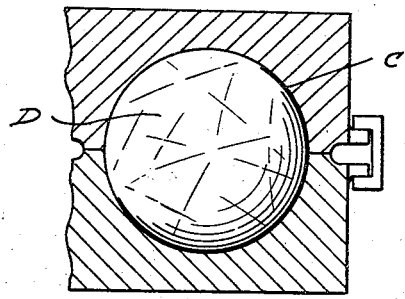
Figure 10:
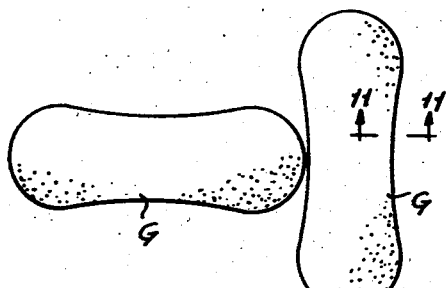
Figure 11:
Figure 12:
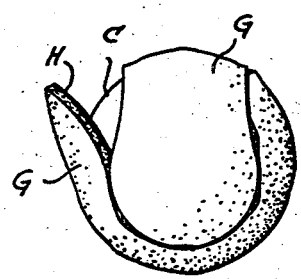
Figure 13:
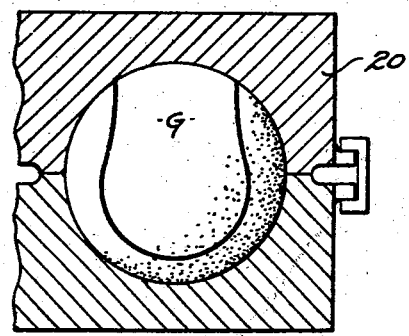
Figure 14:
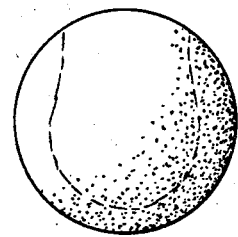
Figure 16:
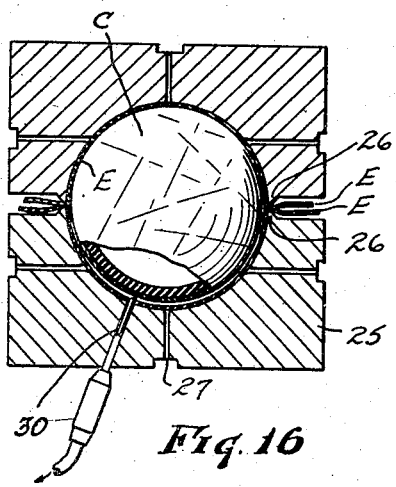
Figure 15:
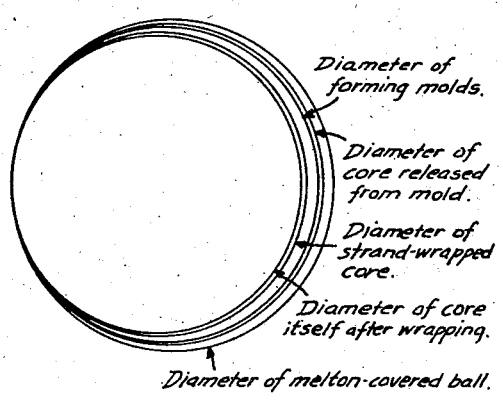
Figure 17:
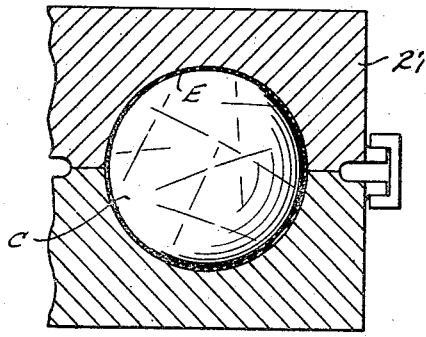
Figure 19:
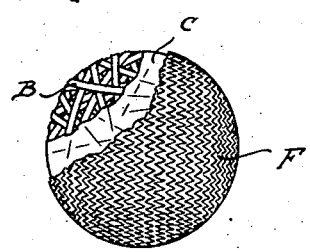
Figure 18:
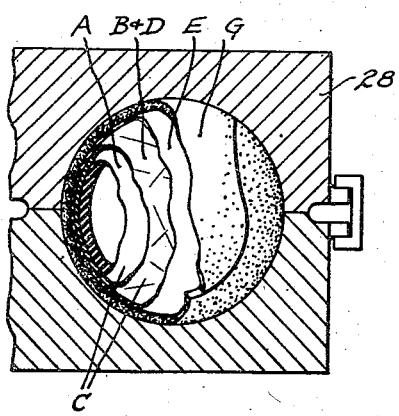
Figure 20:
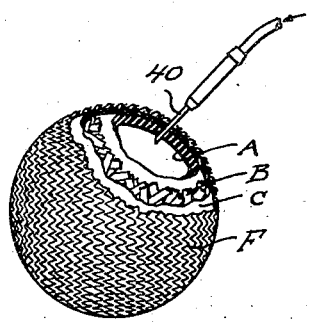

In the drawings, Figs. 1, 2 and 3 illustrate steps in one method of making the original hollow sphere; Figs. 1a, 2a and 3a illustrate steps in another method of making a hollow sphere; Fig. 4 illustrates a sphere made in accordance with the steps illustrated in Figs. 1, 2 and 3; Fig. 4a illustrates a sphere made in accordance with the steps illustrated in Figs. 1a, 2a and 3a; Fig. 5 illustrates the step of winding rubber strands on the original sphere of Fig. 4 or 4a; Fig. 6 is an enlarged fragmentary section of the article shown in Fig. 5, on the line 6—6; Fig. 7 illustrates the wound sphere of Fig. 5 after it has been dipped or coated with latex; Fig. 8 is an enlarged section on the line 8—8 of Fig. 7; Fig. 9 is a view illustrating the step of vulcanizing the wound and latex-covered ball; Fig. 10 illustrates the cover of melton or felt; Fig. 11 is an enlarged fragmentary section taken along the line 11—11 of Fig. 10, illustrating the melton, as provided with a coating or adhering layer of rubber or adhesive; Fig. 12 illustrates the step of applying the melton cover to the wound and latexed ball; Fig. 13 illustrates the step of vulcanizing the covered ball; Fig. 14 is a view of the completed ball; Fig. 15 is a diagram illustrating the varying diameters of the ball at different stages in its manufacture; Fig. 16 illustrates the applying of a rubber covering to the wound and latexed ball, prior to the application of the melton cover; Fig. 17 illustrates the step of vulcanizing the ball produced by Fig. 16; Fig. 18 illustrates the vulcanizing of the ball as completed, having the intermediate rubber sheet between the latex covered bands and the melton; Fig. 19 illustrates a wound ball, for instance the wound and latexed ball of Fig. 7, enclosed by a woven or knitted cover; Fig. 20 illustrates the step of increasing the internal pressure in the ball of Fig. 19.

In carrying out the present invention I first make a hollow rubber sphere, having a comparatively large internal diameter and a comparatively thin wall. As heretofore mentioned, the sphere may, if desired, have an internal fluid pressure greater than atmospheric pressure. Likewise, the sphere may be provided with internal reinforcing ribs.

When an ordinary sphere is used, it may be made by any well known method. However, I prefer to make such sphere by the vacuum seating method, as illustrated, for instance in my prior Patent No. 1,346,848, and reference to such patent may be had for a more complete disclosure of the method of making such sphere. Briefly, however, in this method a sheet of raw rubber $a$, compounded with stiffening fillers, is placed across a mold cavity 10 of each of a pair of coacting mold members, such as those indicated herein at 11, in Fig. 1. These rubber sheets are then drawn into the respective mold cavities by a vacuum, which is applied through suitable passages 12 in the molds. The molds are then brought into mutual registration with the sheets between them, as shown in Fig. 2. The sheets are joined together by pressure between the two mold members and the edges of the sheets are trimmed at each side of the mold cavity by raised cutting edges 14, which form the rims of such cavities. Thus, the sheets are caused to take the shape of an approximate sphere A.

If the ball is to have an internal pressure greater than normal atmospheric pressure, I may place a small quantity of heat expansible substance 15, adapted to form a permanent gas in one of the hemispherical parts, prior to the bringing of the two mold parts together. If desired, I may employ for this purpose the mixture of ammonium chloride and sodium nitrite, as recommended in my Patent No. 1,575,388. Such a mixture, when moist and heated, reacts to generate nitrogen, according to formula $$NH_4Cl + NaNO_2 = NaCl + 2H_2O + 2N$$

After the biscuit has been formed, it is removed from the forming mold 10 and placed in a vulcanizing mold 16, where it is cured sufficiently to cause a permanent set in the rubber and produce a perfect sphere.

If an internally ribbed or braced sphere is to be used, I may use the sphere shown in my prior Patent 1,964,008. This ribbed sphere may be formed by placing portions of rubber $a'$ between a pair of coacting mold members, such as those shown at 17 and 18 in Fig. 1a, and bringing such mold members together, pressing the rubber into the form of a hemisphere, such as that shown at A1, in Fig. 2a. This hemisphere may be provided with ribs on either its interior or exterior wall, as desired. If the ribs are in the interior wall, as indicated by the hemisphere shown in Fig. 2a, two of these spheres as formed are brought together in a vulcanizing mold, such as that shown at 19 in Fig. 3a, and cured sufficiently to cause a permanent set in the rubber; if the ribs are on the exterior, the hemispheres are first turned inside out and then vulcanized.

Spherical balls, made in accord with the methods above described, are illustrated in Figs. 4 and 4a, Fig. 4 illustrating a plain or ordinary ball, and Fig. 4a illustrating an internally ribbed ball. However, it is to be understood that I do not limit this invention to the use of any specific spheres or method of making the sphere, as long as such sphere is relatively light in weight; is hollow; has a relatively large internal diameter and a relatively thin wall; is resilient; and is of material sufficiently stiff to form a base for the winding. The stiffness of the ball is increased, and its porosity reduced, by making the halves originally wrong side out and introverting them before they are joined together.

As heretofore mentioned, I have found that by decreasing the diameter of a sphere, such as either of those shown in Fig. 4 or 4a, I compact the structure of the wall thereof and cause such wall to become impervious to the passage of fluid, such as air or gas, from the interior to the exterior of the ball, and thus I am able to provide a ball which may be used over prolonged periods of time without diminution of the internal pressure or resiliency.

To decrease the diameter of the ball or sphere I form directly on the sphere a thin winding or covering of comparatively narrow rubber bands or strands B, as indicated in Figs. 5 and 6. These strands are of vulcanized rubber, stretched almost to their elastic limit. By so wrapping the sphere A, I decrease the external diameter of the sphere to such an extent that the diameter of the wound sphere is substantially no greater than the diameter of the original sphere, and in case of a fluid or gas-filled sphere, the diameter of the wound sphere is no greater or is less than the diameter of the molds in which it was made. For instance, I find that a plain sphere, formed and cured in molds having cavities 2⅜ inches in diameter, when inflated by the action of heat applied during the curing on pressure-producing substance 15, will expand when removed from the vulcanizing mold and have an outside diameter of about 2½ inches. The outside diameter of this sphere, when wrapped with rubber strands under tension, including the wrapping, will be approximately 2⅜ inches. As the thickness of the layer of rubber strands required to so reduce the diameter of the sphere is approximately 1/64 of an inch, the diameter of the sphere itself, not including the wrapping, will be about 1/32 of an inch smaller than the diameter of the forming and vulcanizing mold, in which the original rubber sphere was made.

In order to stiffen the hollow sphere for the purpose of resisting the application of the strands, I may freeze the sphere, as for instance by imbedding it in solid carbon dioxide, and then wind it with the stretched strands while the sphere is in frozen condition. Such freezing contracts the sphere and reduces the internal pressure; then, after the strands are applied, the thawing of the sphere increases the pressure while the strands hold the thawed sphere to the frozen size.

If desired, the wrapped sphere may be covered immediately with the usual melton covering, using any desirable adhesive, and then subjected to a final vulcanization, to provide a finished product. However, I find it desirable to bind the rubber strands together and also to protect them from any possible deterioration that might be caused if an adhesive is used in applying the covering. I prefer to protect the winding of stretched rubber strands by dipping the ball in latex. Such a ball is shown at C in Figs. 7 and 8, as having a latex coating or filler D. I then permit the latex to dry and apply the melton covering. This coating of latex serves to substantially fill up the spaces between the rubber strands, thereby producing a truer sphere, binding the strands to each other, and protecting the strands from deleterious action by the cement, if the same is used to secure the cover. It also serves to prevent the tension of the strands from being transmitted to the cover, thereby producing a ball, the strands of which, if the cover has been accidentally ruptured, will not tend to increase such rupture.

I further find that if the sphere is vulcanized or subjected to another partial curing to again establish a set in the ball subsequent to the application of the latex covering, and prior to the application of the final melton covering, the ball will be trued up, thus providing greater assurance that the resulting ball will be round. Hence, where the ball, after being covered with latex, is found to be slightly out of round, I may utilize such intermediate vulcanizing or partial curing to true up or bring the ball to shape. Such a step is indicated in Fig. 9. This recuring hardens the latex, and provides a stronger surface to which the final covering may be vulcanized. This intermediate curing or vulcanization further increases the bond between the latex and the strands, thereby increasing the action of the latex in preventing the tensioned rubber strands from increasing an inadvertent rupture of the final covering.

A melton cover for the ball is best shown in Fig. 10. As there shown, it comprises two pieces of melton G, which are wrapped around the wound and latex-covered ball, as indicated in Fig. 12. The latex-covered sphere may be covered with a coating of suitable adhesive or cement prior to the application of the cover, to secure the same to the ball, or, as shown in Fig. 11, a coating of cement H or thin layer of raw rubber may be spread on the inner surface of the melton cover and then pressed into contact with the latex-covered ball, as indicated in Fig. 12. Thereafter, the melton-covered ball is placed in a curing mold 20 and given its final vulcanization, thereby providing the ball, as shown in Fig. 14.

When using certain types of materials in the rubber compound or in the melton covering, or when it is desired to produce a ball having a rubber cover, as distinguished from the melton cover, I may cover the latex-coated wrapped sphere with a rubber cover. This is preferably accomplished by placing a sheet E of raw rubber in mold member 25, Fig. 16, which has cutting edges 26, and vacuum passages 27, similar to those described in connection with the mold members 11 of Fig. 1. These rubber sheets are stretched across the mold cavities, and a vacuum applied, drawing the sheets into the cavities. The latex-coated wrapped sphere C of Fig. 7 is then placed in the cavity of the lower mold member 25, the two mold members brought together, causing the sphere to be enclosed in a rubber cover.

To prevent the accumulation of air between the latex cover and rubber cover, I may provide at least one of the mold members 25 with a needle 30, which penetrates the rubber sheet, but which will not penetrate the layer of rubber strands of the sphere C. I then apply a vacuum through this needle, to withdraw any air which might be trapped between the sphere and the rubber cover. I then remove the rubber-covered sphere from the mold 25 and place it in a vulcanizing mold 26, Fig. 7, provided with cavities, and vulcanize the ball.

If the final product is to have a melton or other covering, I partially complete the vulcanization in the mold 26 and remove the rubber-covered sphere from such mold and apply the usual melton or other covering, as heretofore explained, and again place the ball in a vulcanizing mold, shown at 27 in Fig. 18, and complete the vulcanization of the ball.

In some instances it is desired to provide a ball having a cover which is woven in place on the ball, as for playing squash tennis. In this case, I inflate the ball after the cover has been woven thereon, to insure a very tight fit between the cover and the ball. I have found that the latex-covered wrapped ball C, of Fig. 7, is well adapted for such use. When such a ball is desirable, I use the sphere C shown in Fig. 7, and weave or knit a covering F in place on the ball, as indicated in Fig. 19, and then insert a needle 40 through the walls of the sphere at any point and increase the pressure, as desired, and withdraw the needle.

I have found that when this method of inflating the ball after it has been covered is used, the compression set up in the walls of the ball by the wrapping of rubber strands is sufficiently great to entirely close the opening made by the pressure needle 40, and thus prevent future diminution of the pressure. The pressure needle 40 may be inserted at any point in the wall of the ball and does not require the addition of a sealing plug or other device, as has been generally carried by the internal wall of the ball. Such plug has the disadvantage of requiring the ball to be inflated at a predetermined point, as well as producing a ball which is to a slight extent, at least, lopsided; that is, heavy at the point where such sealing plug is attached to the structure of the ball.

From the foregoing description it will be seen that I have provided an improved and economical method of making a hollow ball, having a comparatively large internal diameter and comparatively thin wall, which ball may have an internal pressure greater than atmospheric pressure, and will maintain such pressure over prolonged periods of time, thereby maintaining the resiliency of the ball and hence its usefulness. I accomplish this by decreasing the diameter of the original sphere which forms the ball, by winding stretched rubber strands directly on such sphere. It will further be seen that I have provided a method of making a ball, wherein the ball is wound with stretched strands of resilient material and such strands are bound in place and protected from adhesive or cement used in holding the covering on the ball, and whereby an injury to or rupture in the cover, even if it extends entirely through the cover, will not destroy the ball.

I claim:

1. The method of making hollow balls of the type which can be indented by hand, comprising forming a hollow sphere of comparatively great internal diameter and having a thin wall of resilient compressible material, compressing such sphere by winding directly upon its exterior stretched strands of a resilient and stretchable material, applying a vulcanizable adhesive to the exterior of the wound ball, and thereafter applying a cover to the wound and treated sphere, and the adhesive being vulcanized after the cover is in place.

2. The method of making balls, comprising forming a hollow rubber sphere, the internal diameter of the sphere being many times the thickness of the wall so that this wall is readily compressible, winding the exterior of the sphere with rubber strands under sufficient tension to produce a wound ball having no greater diameter than the originally formed sphere before inflation, providing the wound sphere with a coating of latex and placing a cover about the coated sphere.

3. The method of making balls, comprising molding hollow hemispheres of rubber or similar material, said hemispheres having a comparatively thin wall, bringing two such hemispheres together to produce a complete sphere, the internal diameter of the sphere being many times the thickness of the wall, establishing an internal fluid pressure within the sphere, winding the exterior of the sphere with strands of rubber or similar material under sufficient tension to produce a wound ball having no greater diameter than the originally moulded ball, covering the wound ball with a coating of latex and placing a cover about the wound ball.

4. The method of making hollow balls of the type which can be indented by hand, comprising forming a closed sphere with a comparatively thin wall of partially cured rubber or similar material, said sphere having a comparatively great internal diameter, winding directly on the exterior of such sphere, a thin layer of stretched strands of rubber to compress the wall of the sphere, coating the wound ball with latex, applying a cover to the partially cured ball and subsequently completing the curing of the ball.

5. The method of making a hollow ball of the type which can be indented by hand and is of light weight, comprising forming a hollow sphere with a thin wall of rubber or similar material, and having a comparatively great internal diameter, compressing such wall without allowing it to collapse by means of externally applied stretched rubber strands, coating the wound ball with latex, covering the latex-coated ball with a cover of rubber or similar material.

6. The method of making a hollow ball of the type which can be indented by hand and is of light weight, comprising forming a hollow sphere with a thin wall of rubber or similar material, and having a comparatively great internal diameter, compressing such wall without allowing it to collapse by means of externally applied stretched elastic strands, coating the wound ball with latex, covering the latex-coated ball with a flexible cover of rubber or similar material, and thereafter applying a fabric cover to the ball.

7. The method of making a hollow ball of the type which can be indented by hand, and is of light weight, comprising forming a hollow sphere with a thin wall of rubber or similar material, said sphere having comparatively great internal diameter, compressing such wall without allowing it to collapse by means of externally applied stretched strands of rubber or similar material wound directly on the sphere, after the sphere is wound applying to its exterior an adhesive substance passing into and substantially filling the spaces between the strands, and finally securing a cover in position on said wound sphere in contact with said adhesive.

8. The method of making a tennis ball, comprising making a closed hollow sphere of rubber, such sphere having a comparatively great internal diameter and a comparatively thin wall, winding a layer of stretched rubber strands upon the exterior of the sphere, thereby compressing the wall of the sphere, whereby such wall is made impervious to the passage of fluid pressure from within the ball to the exterior of the ball, coating the wound ball with latex in such a manner that the latex will fill the interstices between the strands of rubber, securing a melton cover to said strands, and thereafter vulcanizing the unit as a whole.

9. The method of making hollow balls of the type which can be indented by hand, comprising forming a hollow sphere of comparatively great internal diameter with a thin wall of resilient compressible material, compressing such sphere by winding directly upon its exterior stretched strands, applying a coating of latex to the exterior of the wound ball, subjecting said coated ball to heat while in the confines of a mold to form a true sphere, thereafter applying a fabric cover to the sphere, and finally subjecting the covered ball to a vulcanizing heat after the cover is in place.

10. A method of making balls, comprising forming a hollow sphere of incompletely cured rubber, the internal diameter of the sphere being many times the thickness of the wall so that this wall is readily compressible, winding the exterior of the sphere with elastic strands under sufficient tension to produce a wound ball having no greater diameter than the originally formed sphere before inflation, providing the wound sphere with a coating of latex, partially completing the vulcanization of said latex coated strand covered sphere in a forming mold, thereafter applying a cover to said sphere and finally completing the vulcanization of the covered sphere.

11. The method of making a hollow ball of the type which can be indented by hand, and is of light weight, comprising forming a hollow sphere with a thin wall of uncured rubber or similar curable material, said sphere having comparatively great internal diameter, compressing such wall without allowing it to collapse by means of externally applied stretched elastic strands wound directly on the sphere, after the sphere is wound partially curing the sphere, applying a cover to said wound and partially cured sphere by a curable adhesive, and finally completing the curing of the sphere and adhesive simultaneously.

12. The method of making hollow balls of the type which can be indented by hand, comprising forming a hollow sphere of comparatively great internal diameter with a thin wall of resilient compressible material, such as rubber, compressing such sphere by winding directly upon its exterior stretched strands of rubber or similar material, applying adhesive to the exterior of the wound ball, applying a coating thereafter of adhesive to a fabric material, applying said coated fabric material to the wound and treated sphere, and thereafter subjecting the covered ball to a vulcanization process to set the adhesive and cure the sphere.

13. The method of making balls, comprising molding hollow hemispheres of rubber or similar material inside out, said hemispheres having a comparatively thin wall introverting two such hemispheres to compress the inner region of the wall, bringing two such introverted hemispheres together to produce a complete sphere, the internal diameter of the sphere being many times the thickness of the wall, winding the exterior of the sphere with strands of rubber or similar material under tension to produce a wound ball, covering the wound ball with a coating of adhesive, placing a cover about the wound ball, and vulcanizing the covered ball.

14. The method of making balls, comprising molding hollow hemispheres of rubber or similar material, said hemispheres having a comparatively thin wall introverting two such hemispheres to compress the inner portion of the wall, bringing two such introverted hemispheres together to produce a complete sphere, the internal diameter of the sphere being many times the thickness of the wall, establishing an internal fluid pressure within the sphere, winding the exterior of the sphere with strands of rubber or similar material under sufficient tension to produce a wound ball having no greater diameter than the originally moulded ball, covering the wound ball with a coating of adhesive and placing a cover about the wound ball.

15. The method of making balls comprising molding hollow hemispheres of rubber with a comparatively thin wall, bringing such hemispheres together to produce a complete sphere, the hollow internal diameter of the ball being many times the thickness of the wall, so that this wall is readily compressible, winding the exterior of the ball with rubber strands under sufficient tension to produce a wound ball having no greater diameter than the originally molded ball, and placing a cover about the wound ball.

16. The method of making hollow balls of the type that can be indented appreciably by hand, comprising forming a hollow sphere of vulcanizable rubber, and with a wall that is thin compared to the diameter of the sphere, partially curing the sphere, winding a rubber strand under tension around the sphere with a sufficient number of turns substantially to cover the sphere, applying vulcanizable adhesive material over the winding, applying a cover to the adhesive and then enclosing the covered sphere and vulcanizing the adhesive to secure the cover while completing the curing of the sphere.

17. The method of making hollow balls of the type that can be indented appreciably by hand, comprising forming a hollow pneumatically tight pliable sphere with a wall that is thin compared to the diameter of the sphere, winding elastic strands under tension around the sphere with a sufficient number of turns substantially to cover the sphere, but having an average thickness no greater than the thickness of the wall of the sphere, applying vulcanizable adhesive material over the wound strands, and securing a cover over the wound sphere by vulcanizing the completed ball as a whole.

18. The method of making hollow balls of the type that can be indented appreciably by hand, comprising forming a pneumatically tight hollow sphere from readily pliable elastic material, winding directly upon the surface of the sphere an elastic strand to form substantially a complete covering for the sphere, maintaining sufficient tension on the strand so that the sphere is compressed and the internal pressure of the sphere is increased, limiting the number of turns so that the diameter of the ball is not increased beyond the diameter of the sphere before winding, applying to the exterior of the wound sphere a coating of vulcanizable adhesive, applying a cover over the adhesive, and thereafter vulcanizing the completed ball as a whole.

FRED THOMAS ROBERTS.